(12) United States Patent
Izumiya et al.

(10) Patent No.: US 11,618,199 B2
(45) Date of Patent: Apr. 4, 2023

(54) TWIN-SCREW EXTRUDER, GEAR BOX AND METHOD FOR EXTRUSION

(71) Applicants: The Japan Steel Works, Ltd., Tokyo (JP); Tokyo Printing Ink Mfg. Co., Ltd., Tokyo (JP)

(72) Inventors: Kazutoshi Izumiya, Hiroshima (JP); Katsumi Sumida, Hiroshima (JP); Yoshitaka Kimura, Hiroshima (JP); Masashi Tanimoto, Hiroshima (JP); Hiroyuki Okuma, Saitama (JP); Katsuyuki Kaneko, Saitama (JP); Shizuo Ueshige, Hiroshima (JP); Nobuaki Tanaka, Hiroshima (JP); Takahiro Nakamaru, Hiroshima (JP)

(73) Assignee: THE JAPAN STEEL WORKS, LTD., Shinagawa-ku (JP)

( * ) Notice: Subject to any disclaimer, the term of this patent is extended or adjusted under 35 U.S.C. 154(b) by 218 days.

(21) Appl. No.: 16/969,412

(22) PCT Filed: Feb. 13, 2019

(86) PCT No.: PCT/JP2019/005028
§ 371 (c)(1),
(2) Date: Aug. 12, 2020

(87) PCT Pub. No.: WO2019/159946
PCT Pub. Date: Aug. 22, 2019

(65) Prior Publication Data
US 2020/0398474 A1 Dec. 24, 2020

(30) Foreign Application Priority Data

Feb. 13, 2018 (JP) .............................. JP2018-022961

(51) Int. Cl.
*B29C 48/25* (2019.01)
*B29C 48/64* (2019.01)
(Continued)

(52) U.S. Cl.
CPC ........ *B29C 48/2526* (2019.02); *B29C 48/402* (2019.02); *B29C 48/64* (2019.02); *F16H 1/22* (2013.01)

(58) Field of Classification Search
CPC .................................................... B29B 7/427
See application file for complete search history.

(56) References Cited

U.S. PATENT DOCUMENTS 2,902,923 A * 9/1959 Stacy .................. B29C 48/2564
100/145
3,813,082 A * 5/1974 Manser ..................... A21C 1/06
366/349

FOREIGN PATENT DOCUMENTS

CN 202901175 U 4/2013
JP H539914 U 5/1993
(Continued)

OTHER PUBLICATIONS

International Search Report dated Apr. 9, 2019 in PCT/JP2019/005028 with English-language translation (5 pgs.).

*Primary Examiner* — Galen H Hauth
(74) *Attorney, Agent, or Firm* — Foley & Lardner LLP

(57) ABSTRACT

A twin-screw extruder is provided in which screws have different rotational speeds depending on the process of treating the raw material and in which degradation of the raw material is less likely to occur.
Twin-screw extruder 1 has two screws 3, 5 that extend in parallel to each other. Each screw 3, 5 has cylindrical upstream screw 31 and downstream screw 35, wherein upstream screw 31 has shaft hole 315 that extends in longitudinal direction X and screw flight 316 on an outer (Continued)

circumferential surface thereof, and downstream screw 35 includes large diameter portion 353 having screw flight 357 on an outer circumferential surface thereof and small diameter shaft portion 351 that has a smaller diameter than large diameter portion 353, wherein small diameter shaft portion 351 of downstream screw 35 is inserted into shaft hole 315 of upstream screw 31. Upstream screw 31 and downstream screw 35 can be independently rotated. Twin-screw extruder 1 further includes upstream rotating mechanism 84 that rotates upstream screws 31 of two screws 3, 5, and downstream rotating mechanism 83 that rotates downstream screws 35 of two screws 3, 5.

11 Claims, 7 Drawing Sheets

(51) Int. Cl.
*B29C 48/40* (2019.01)
*F16H 1/22* (2006.01)

(56) References Cited

FOREIGN PATENT DOCUMENTS

| | | |
|---|---|---|
| JP | H11-216353 A | 8/1999 |
| JP | H11-268099 A | 10/1999 |
| JP | 2006-116959 A | 5/2006 |
| JP | 2007-130775 A | 5/2007 |
| JP | 2007-210298 A | 8/2007 |
| JP | 2016-088093 A | 5/2016 |
| WO | WO-2013087108 A1 * 6/2013 .......... B01F 7/00708 |

\* cited by examiner

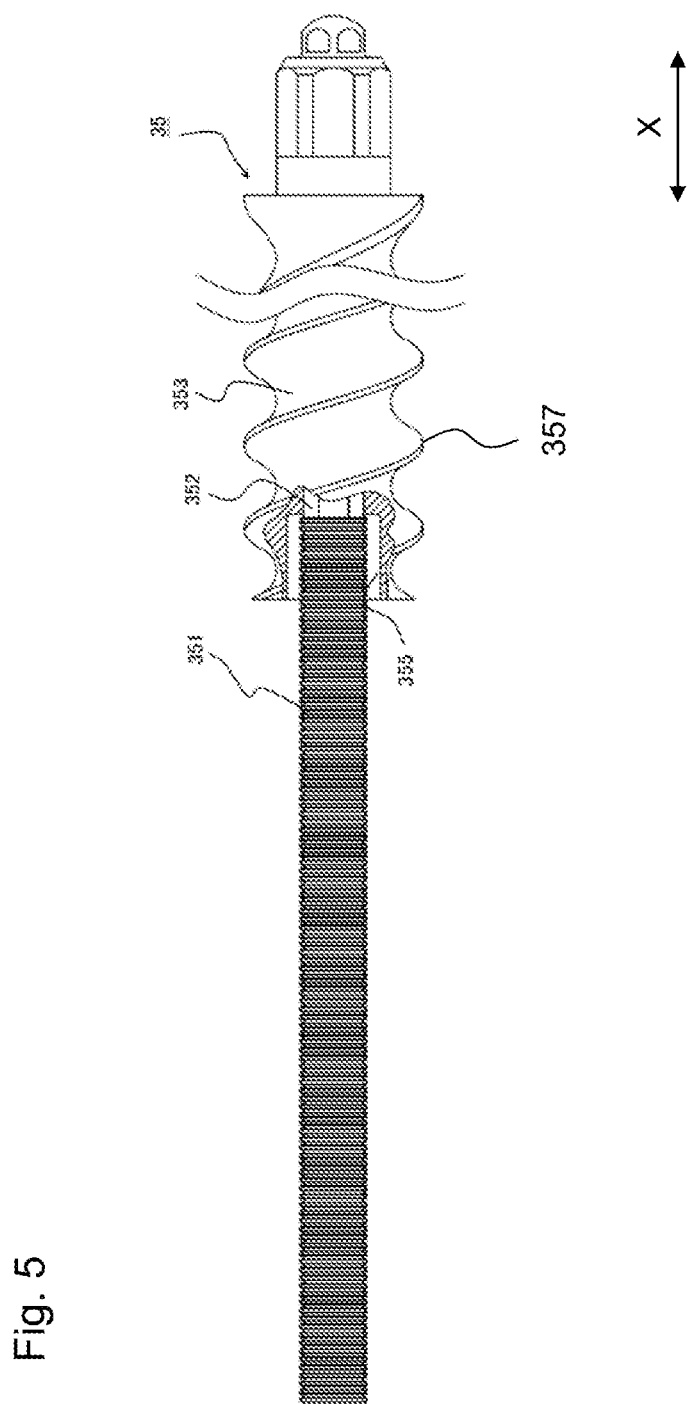

TWIN-SCREW EXTRUDER, GEAR BOX AND METHOD FOR EXTRUSION

FIELD OF THE INVENTION

Cross Reference to Related Application

The present invention relates to a twin-screw extruder, a gear box and a method for extrusion.

The present application is the U.S. National Stage of PCT/JP2019/005028, filed Feb. 13, 2019, which claims priority from, JP2018-22961, filed on Feb. 13, 2018, the disclosure of which is hereby incorporated by reference herein in its entirety.

BACKGROUND OF THE INVENTION

An extruder for treating raw material, such as resin or elastomer, typically comprises an elongate cylindrical barrel and a screw that is housed in the barrel. The raw material that is supplied to the extruder is rotated and agitated in the barrel by means of a screw, and is extruded as a molded product having predetermined physical properties and shape. The screw that is housed in the barrel is a rod-shaped member having screw flights (screw blades) on the outer circumferential surface thereof, and has different shapes depending on the locations in the barrel. Specifically, an extruder includes a feeding portion (a conveying portion), a kneading portion (a compressing portion, a mixing portion or a plasticizing portion) and a metering portion, which are arranged in that order from the upstream side in the flow direction of the raw material. The feeding portion supplies solid raw material to the downstream kneading portion while compressing the raw material. The kneading portion melts and plasticizes the raw material that is supplied from the feeding portion. The metering portion adjusts the amount of discharge in order to uniformly discharge the material that is plasticized in the kneading portion. Depending on the treatment at each portion of the extruder, the screw has different shapes in the longitudinal direction. However, since a screw typically consists of a single rod-shaped member having screw flights on the outer circumferential surface, as described above, it is impossible to partially change the rotational speed in the longitudinal direction. Therefore, if it is desired that the screw have different rotational speeds depending on the process at each portion of the extruder, a tandem-type extruder is used, as disclosed in Patent Documents 1 and 2.

In the tandem-type extruder described in Patent Documents 1 and 2, the resin discharge port of the upstream extruder is connected to the raw material feeding port of the downstream extruder via a connecting pipe. The upstream extruder substantially corresponds to the feeding portion and the kneading portion, and the downstream extruder substantially corresponds to the metering portion. That is, in the tandem-type extruder described in Patent Documents 1 and 2, the feeding and kneading portions and the metering portion are constructed as separate apparatuses (the upstream extruder and the downstream extruder) independent of each other. Thus, it is possible to change not only the configuration of the screws but also the rotational speed of the screws depending on the processes and to thereby achieve proper processing.

Patent Document 1: JP 2007-130775
Patent Document 2: JP 2016-88093

SUMMARY OF THE INVENTION

In the tandem-type extruder described in Patent Documents 1 and 2, the upstream extruder and the downstream extruder are connected by the connecting pipe. However, high-temperature raw material that is plasticized in the upstream extruder may be scorched and adhere to the inner wall of the connection pipe where no movable element is present and may stay for a long time in the connecting pipe. If the raw material that has been scorched and adhered peels off and flows into the downstream extruder, then the raw material that is treated by the downstream extruder may deteriorate. If the upstream extruder and downstream extruder are integrated, the connection pipe is not required, but it is impossible for the screw to have different rotational speeds at different portions.

In view of the problem mentioned above, it is an object of the present invention to provide a twin-screw extruder in which screws have different rotational speeds depending on the process of treating the raw material and in which degradation of the raw material is less likely to occur, as well as a method for extrusion using the same, and a gear box used for the twin-screw extruder.

A twin-screw extruder of the present invention comprises:

two screws that extend in parallel to each other, wherein each screw has a cylindrical upstream screw and a downstream screw, wherein the upstream screw has a shaft hole that extends in a longitudinal direction and a screw flight on an outer circumferential surface thereof, and the downstream screw includes a large diameter portion having a screw flight on an outer circumferential surface thereof and a small diameter shaft portion that has a smaller diameter than the large diameter portion, wherein the small diameter shaft portion of the downstream screw is inserted into the shaft hole of the upstream screw, and the upstream screw and the downstream screw can be independently rotated;

an upstream rotating mechanism that rotates the upstream screws of the two screws; and a downstream rotating mechanism that is provided independent of the upstream rotating mechanism and that rotates the downstream screws of the two screws.

A method of extrusion of the present invention relates to a method using a twin-screw extruder, wherein the extruder includes two screws that extend in parallel to each other, wherein each screw has a cylindrical upstream screw and a downstream screw, wherein the upstream screw has a shaft hole that extends in a longitudinal direction and a flight on an outer circumferential surface thereof, and the downstream screw includes a large diameter portion having a flight on an outer circumferential surface thereof and a small diameter shaft portion that has a smaller diameter than the large diameter portion, wherein the small diameter shaft portion of the downstream screw is inserted into the shaft hole of the upstream screw, and the upstream screw and the downstream screw can be independently rotated, and the method comprised the steps of:

supplying raw material to the upstream screws of the two screws, rotating the upstream screws of the two screws by means of an upstream rotating mechanism; and rotating the downstream screws of the two screws by means of a downstream rotating mechanism that is provided independent of the upstream rotating mechanism, wherein the downstream screws are rotated at a rotational speed different from a rotational speed of the upstream screws.

A gear box of the present invention is incorporated into a twin-screw extruder, wherein the extruder includes two screws that extend in parallel to each other, wherein each screw has an upstream screw having a flight on an outer circumferential surface thereof and a downstream screw having a flight on an outer circumferential surface thereof, and the upstream screw and the downstream screw can be independently rotated. The gear box comprises:

an upstream input shaft;

a downstream input shaft;

a first upstream output shaft that is connected to the upstream screw of one of the screws and that has a shaft hole;

a second upstream output shaft that is connected to the upstream screw of the remaining screw and that has a shaft hole;

a first downstream output shaft that penetrates through the shaft hole of the first upstream output shaft and that is connected to the downstream screw of the one of screws;

a second downstream output shaft that penetrates through the shaft hole of the second upstream output shaft and that is connected to the downstream screw of the remaining screw;

an upstream transmission element that transmits rotation of the upstream input shaft to the first upstream output shaft and to the second upstream output shaft; and a downstream transmission element that transmits rotation of the downstream input shaft to the first downstream output shaft and to the second downstream output shaft.

According to the present invention, it is possible to provide a twin-screw extruder in which screws have different rotational speeds depending on the process of treating the raw material and in which degradation of the raw material is less likely to occur, as well as a method for extrusion using the same, and a gear box used for the twin-screw extruder.

The above and other objects, features and advantages of the present invention will become apparent from the following description with reference to the accompanying drawings which illustrate examples of the present invention.

BRIEF DESCRIPTION OF THE DRAWINGS

FIG. 5 is a plan view showing the downstream screw of the screw shown in FIG. 3A;

LIST OF REFERENCE NUMERALS

1: twin-screw extruder, 2: extruder for the feeding portion, 3: left screw, 31: left upstream screw, 311: cylindrical member, 312: screw piece, 313: fitting portion, 314: engaging portion, 315: shaft hole, 35: left downstream screw, 351: transmission shaft portion, 352: rotary shaft portion, 353: screw piece, 354: labyrinth groove, 355: concave portion, 356: engaging portion, 5: right screw, 51: right upstream screw, 55: right downstream screw, 7: gear box, 71: upstream input shaft, 72: downstream input shaft, 73: left upstream output shaft, 74: left downstream output shaft, 75: right upstream output shaft, 76: right downstream output shaft, 77: upstream intermediate shaft, 78, 79: downstream intermediate transmission element, 83: downstream rotating mechanism, 84: upstream rotating mechanism, 85: downstream transmission element, 86: upstream transmission element, 9: barrel, 91: raw material feeding portion, 92: discharge portion, g1 to g18: gear

DETAILED DESCRIPTION OF THE EMBODIMENTS

Hereinafter, an embodiment of the present invention will be described with reference to the drawings.

Figure 1:
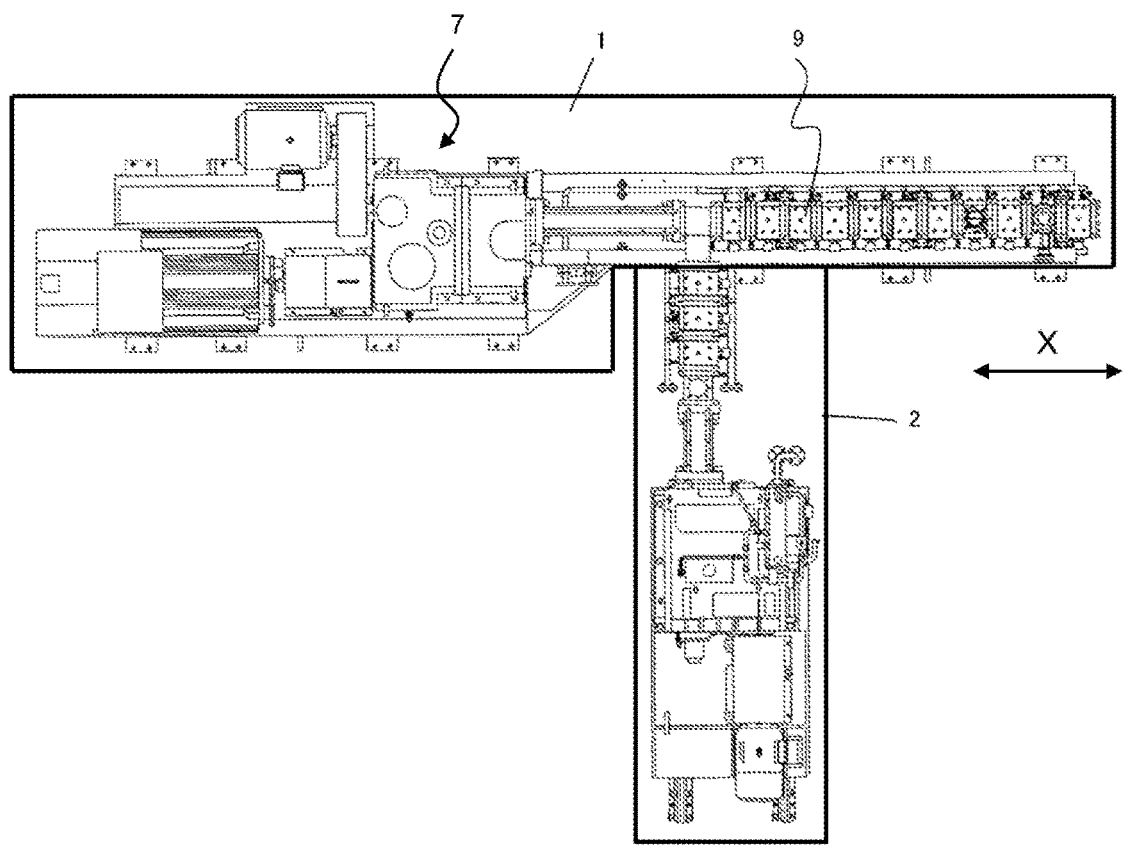
FIG. 1 is a plan view of a twin-screw extruder according to an embodiment of the present invention and an extruder for the feeding portion that supplies raw material to the twin-screw extruder.

FIG. 1 is a plan view of twin-screw extruder 1 according to an embodiment of the present invention and extruder 2 for the feeding portion that supplies raw material to twin-screw extruder 1. Twin-screw extruder 1 is connected to extruder 2 for the feeding portion so as to form a tandem-type extruder.

Figure 2:
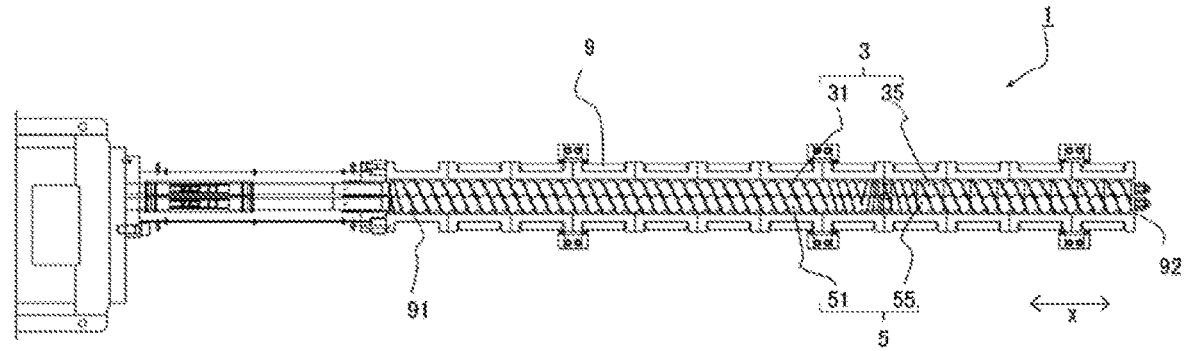
FIG. 2 is a plan view showing the interior of the barrel of the twin-screw extruder shown in FIG. 1.

Extruder 2 for the feeding portion premixes the raw material that is supplied from a feeder (not shown). The raw material that is premixed by extruder 2 for the feeding portion is supplied to twin-screw extruder 1. FIG. 2 is a plan view showing the inner structure of barrel 9 of twin-screw extruder 1. Twin-screw extruder 1 includes first screw (a left screw) 3 and second screw (a right screw) 5. Left screw 3 and right screw 5, which substantially have the same configuration, extend in longitudinal direction X in close proximity and in parallel with each other in barrel 9. Left screw 3 consists of first upstream screw (a left upstream screw) 31 and first downstream screw (a left downstream screw) 35. Similarly, right screw 5 consists of second upstream screw (a right upstream screw) 51 and second downstream screw (a right downstream screw) 55. Left screw 3 and right screw 5 mesh with each other while rotating in the same direction. This allows left screw 3 and right screw 5 to wipe the outer surface of the other screw 5, 3, as well as the inner wall of barrel 9 that surrounds themselves, respectively. Such self-cleaning performance of left screw 3 and right screw 5 prevents the raw material from scorching and adhering to the outer surfaces of the screws and the inner wall of barrel 9.

<Configuration of the Screws>

Figure 3A:
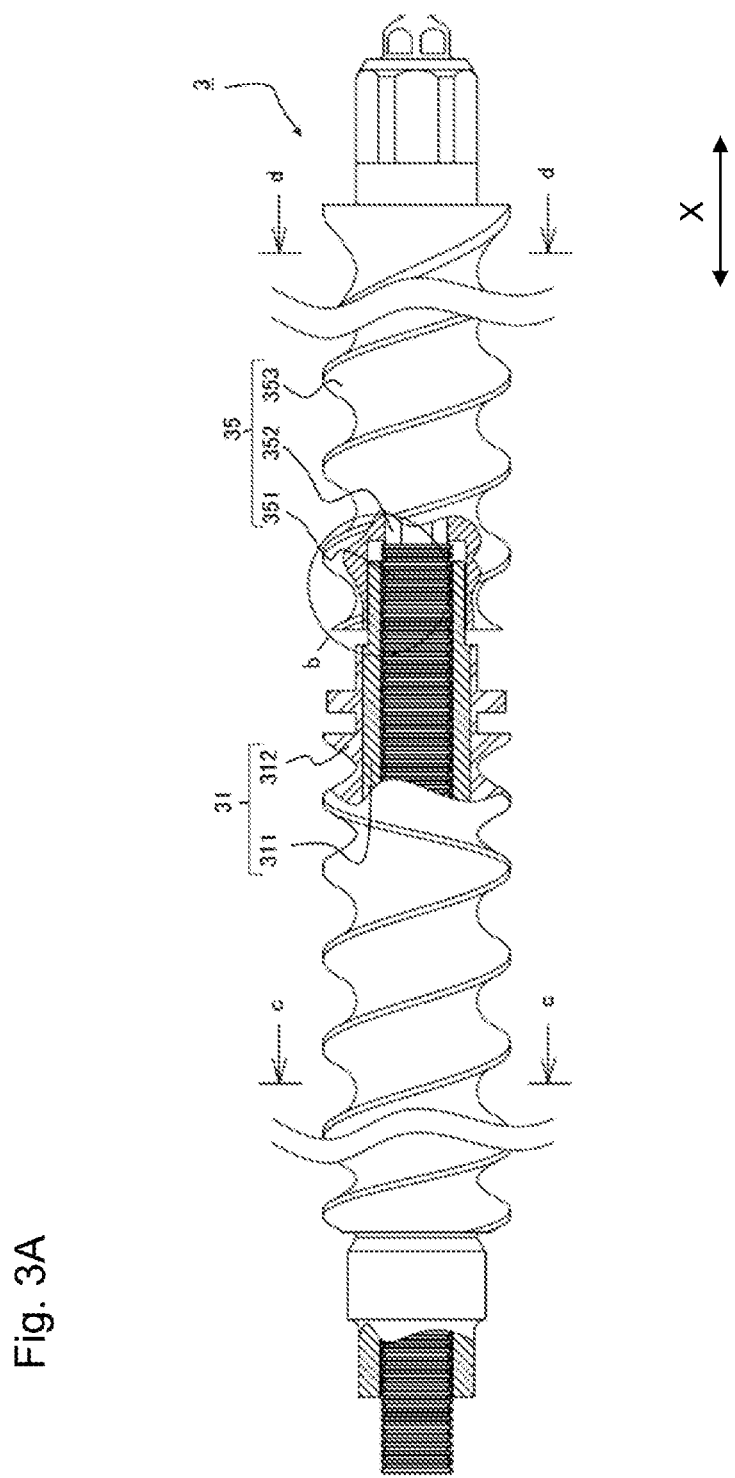
FIG. 3A is a partial broken plan view showing the configuration of the screw used in the twin-screw extruder shown in FIG. 2.
Figure 3B:
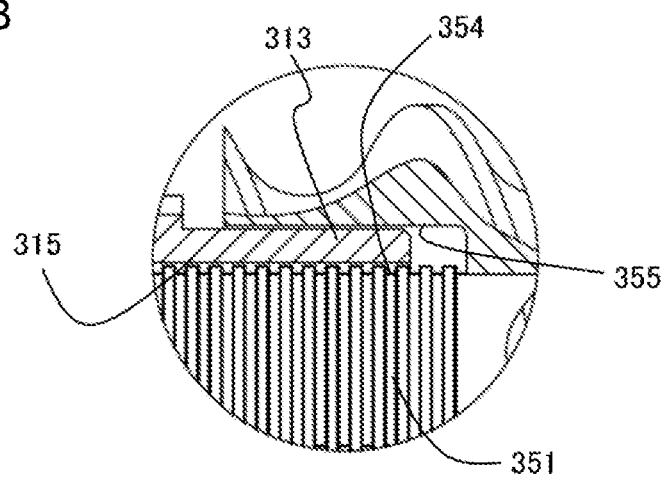
FIG. 3B is an enlarged view of part b in FIG. 3A.
Figure 3C:
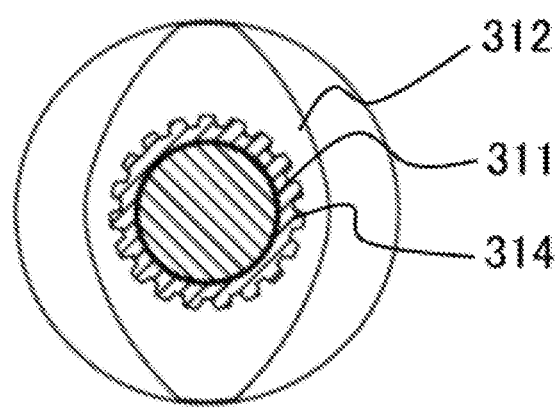
FIG. 3C is a cross sectional view taken along line c-c in FIG. 3A.
Figure 3D:
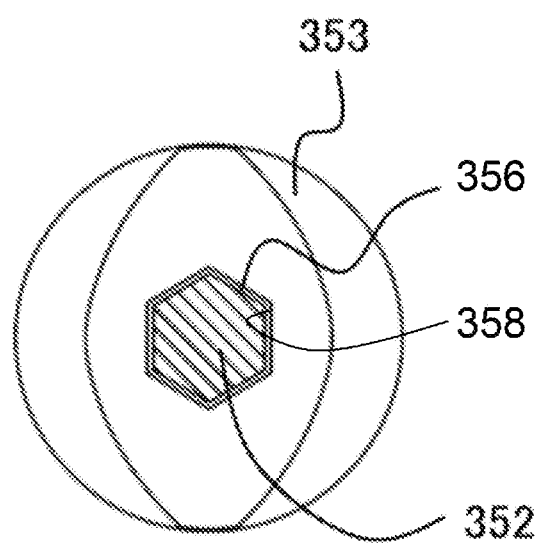
FIG. 3D is a cross sectional view taken along line d-d in FIG. 3A.
Figure 4:
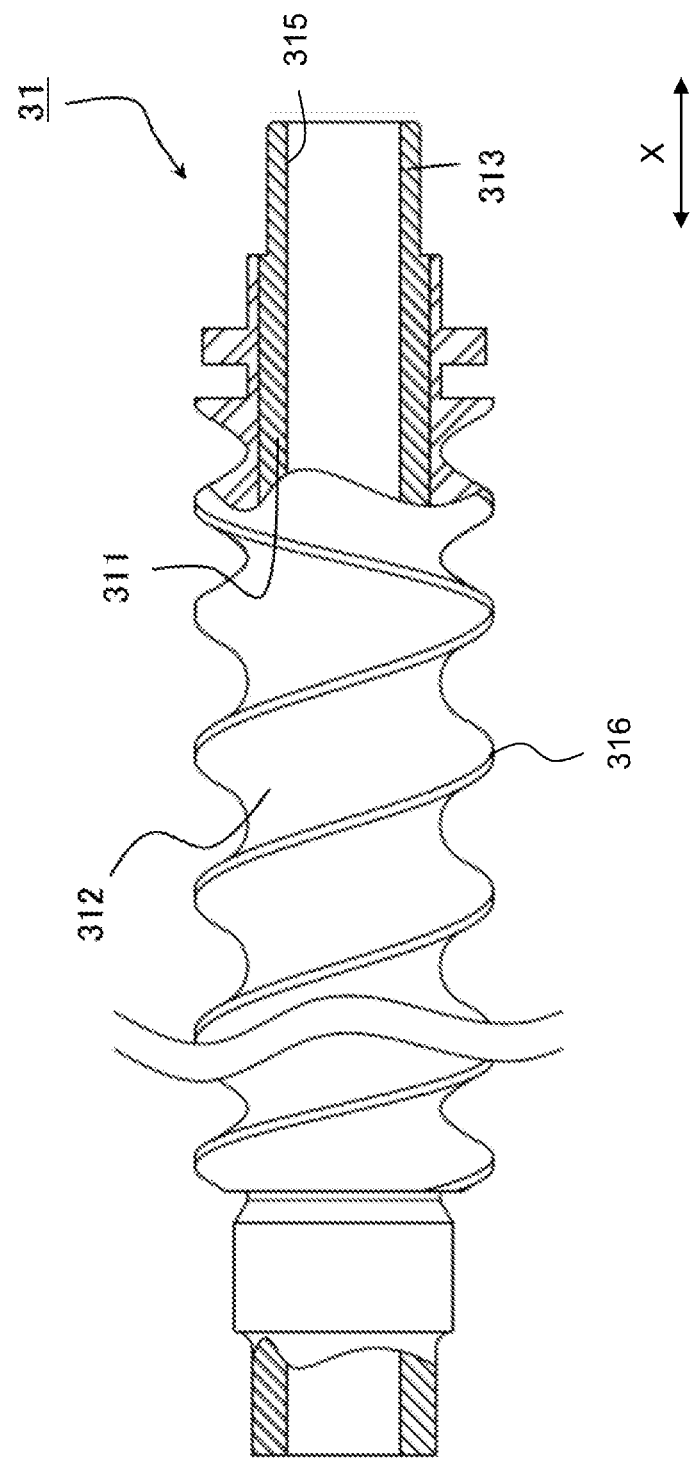
FIG. 4 is a plan view showing the upstream screw of the screw shown in FIG. 3A.

Next, the configuration of left screw 3 and right screw 5 will be described in more detail. Since right screw 5 substantially has the same configuration as left screw 3, the explanation will be omitted. FIG. 3A is a plan view showing the configuration of left screw 3 that is used for twin-screw extruder 1. FIG. 3B is an enlarged view of part b in FIG. 3A. FIG. 3C is a cross sectional view taken along line c-c in FIG. 3A. FIG. 3D is a cross sectional view taken along line d-d in FIG. 3A. FIG. 4 is a plan view showing left upstream screw 31 of left screw 3 shown in FIG. 3A. FIG. 5 is a plan view showing left downstream screw 35 of screw 3 shown in FIG. 3A.

Left upstream screw 31 of left screw 3 has a double cylindrical structure, which consists of cylindrical screw piece 312 and cylindrical member 311 that is housed in screw piece 312. That is, cylindrical member 311 is a hollow cylinder and has shaft hole 315 that extends in longitudinal direction (the axial direction) X. Fitting portion 313 that is shaped in a cylindrical protrusion is formed at the downstream end of left upstream screw 31, where left downstream screw 35 is inserted (see FIGS. 3B, 4). Fitting portion 313 fits into concave portion 355 that is formed in left downstream screw 35, described later. Involute teeth that form engaging portion 314 are provided on the outer circumferential surface of cylindrical member 311. Screw piece 312 is a hollow cylindrical member having screw flights 316 on the outer circumferential surface thereof, and engaging grooves (not shown) that correspond to engaging portion 314 of cylindrical member 311 are formed on the inner circumferential surface thereof. Therefore, screw piece 312 is fitted onto cylindrical member 311 such that engaging portion 314 engages the engaging grooves (see FIG. 3C). Screw flights 316 of screw piece 312 are positioned on the outer circumferential surface of left upstream screw 31. Screw piece 312 is an element that can be removed from cylindrical member 311 for replacement. Therefore, screw piece 312 can be replaced in accordance with the raw material and the specification of the product that is produced by twin-screw extruder 1.

Left downstream screw 35 includes transmission shaft portion 351, rotary shaft portion 352 and screw piece 353. Screw piece 353 constitutes large diameter portion 353 that is located at one end of left downstream screw 35. Transmission shaft portion 351 and rotary shaft portion 352 are concentric and rod-shaped members that are adjacent to each other and continuous (integrated) in longitudinal direction X. Transmission shaft portion 351 constitutes small diameter shaft portion 351 that is located at the other end of left downstream screw 35 and that has a smaller diameter than large diameter portion 353. A plurality of labyrinth grooves 354, that are circumferentially formed circular grooves, is formed on the outer circumferential surface of transmission shaft portion 351 (see FIG. 3B). No labyrinth groove 354 is formed on the outer circumferential surface of rotary shaft portion 352. Transmission shaft portion 351 is inserted into and penetrates through shaft hole 315 of left upstream screw 31. Therefore, the outer diameter of transmission shaft portion 351 is slightly smaller than the inner diameter of shaft hole 315 of cylindrical member 311 of left upstream screw 31.

Rotary shaft portion 352 has a hexagonal cross section and functions as engaging portion 356. Screw piece 353 is a hollow cylindrical member having screw flights 357 on the outer circumferential surface thereof, and engaging hole 358 that corresponds to engaging portion 356 of rotary shaft portion 352 is formed therein. The diameter of the circumscribed circle of engaging hole 358 is slightly larger than the diameter of the circumscribed circle of rotary shaft portion 352. Therefore, screw piece 353 is fitted onto rotating shaft portion 352. The length of screw piece 353 in longitudinal direction X is smaller than the sum of the length of rotary shaft portion 352 in longitudinal direction X and the length of transmission shaft portion 351 in longitudinal direction X, so that at least a portion of transmission shaft portion 351 is exposed without being covered by screw piece 353. The outer diameter of screw piece 353 is larger than the outer diameters of transmission shaft portion 351 and rotary shaft portion 352, and is substantially equal to the outer diameter of screw piece 312. The diameter of the circumscribed circle of rotary shaft portion 352 is slightly smaller than the inner diameter of cylindrical member 311 of left upstream screw 31. Screw piece 353 can be removed from transmission shaft portion 351 and rotary shaft portion 352 for replacement. Concave portion 355, that is a cylindrical hole that extends in longitudinal direction X, is formed at the upstream end of screw piece 353, where rotary shaft portion 352 is inserted (see FIG. 3B). Fitting portion 313 that is formed in left upstream screw 31 is fitted into concave portion 355.

In left screw 3 thus constructed, screw piece 312 and screw piece 353 having substantially the same outer diameter are arranged adjacent to each other in longitudinal direction X, and screw flights 316, 357 having substantially the same shape are arranged on the outer circumferential surfaces thereof substantially continuously in longitudinal direction X. However, screw piece 312 having screw flights 316 of left upstream screw 31 and screw piece 353 having screw flights 357 of left downstream screw 35 are not integrated and can be rotated independent of each other.

<Gear Box>

Figure 6A:
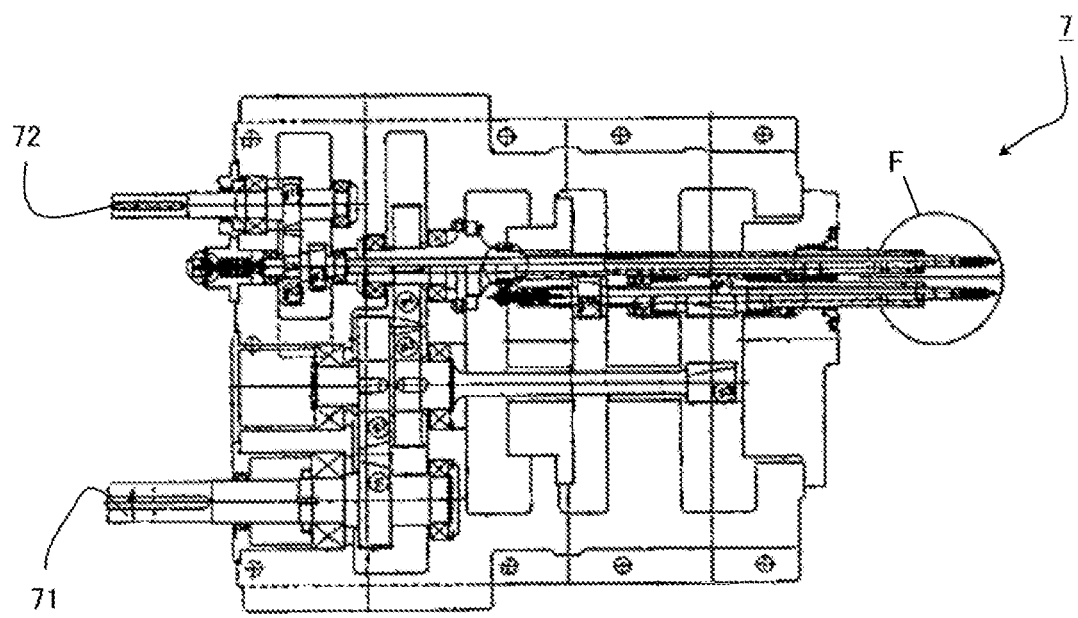
FIG. 6A is a plan view showing the inner structure of the gear box that is used for the twin-screw extruder shown in FIG. 2.
Figure 6B:
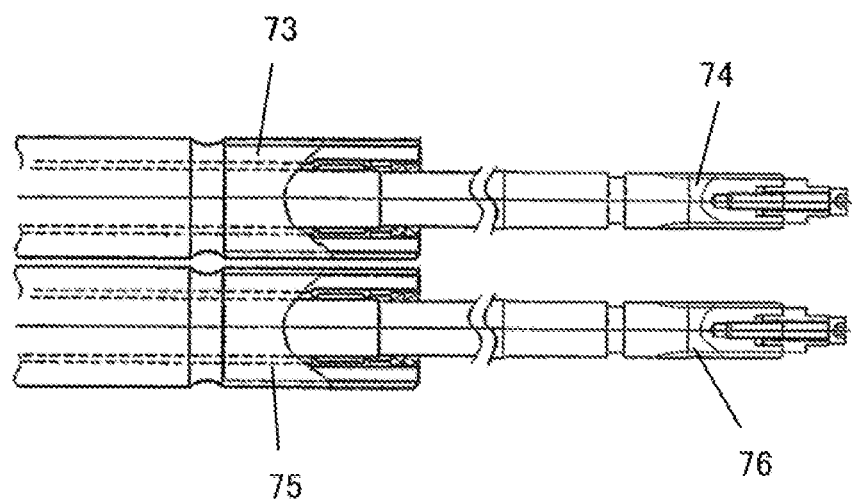
FIG. 6B is an enlarged view of part F in FIG. 6A.

Next, the configuration of the gear box that transmits rotational driving force to screws 3, 5 of twin-screw extruder 1 will be described. FIG. 6A is a view of the internal structure showing the configuration of gear box 7 that is used for twin-screw extruder 1. FIG. 6B is an enlarged view of part F in FIG. 6A. Gear box 7 includes upstream input shaft 71, downstream input shaft 72, left upstream output shaft (a first upstream output shaft) 73, left downstream output shaft (a first downstream output shaft) 74, right upstream output shaft (a second upstream output shaft) 75 and right downstream output shaft (a second downstream output shaft) 76.

Left upstream output shaft 73 and right upstream output shaft 75 are hollow shafts that are composed of hollow cylindrical members. Left downstream output shaft 74 that is concentric with left upstream output shaft 73 is disposed in left upstream output shaft 73. Similarly, right downstream output shaft 76 that is concentric with the central axis of right upstream output shaft 75 is disposed in right upstream output shaft 75.

Downstream input shaft 72 is coupled both to left downstream output shaft 74 and right downstream output shaft 76 in order to transmit rotational force to left downstream output shaft 74 and right downstream output shaft 76. Left downstream output shaft 74 is coupled to transmission shaft portion 351 of left downstream screw 35 of left screw 3, described above, in order to transmit rotational force to transmission shaft portion 351 of left downstream screw 35. Right downstream output shaft 76 is coupled to transmission shaft portion 351 of right downstream screw 55 of right screw 5 having substantially the same configuration as left screw 3, described above, in order to transmit rotational force to transmission shaft portion 351 of right downstream screw 55. On the other hand, upstream input shaft 71 is connected both to left upstream output shaft 73 and right upstream output shaft 75 in order to transmit rotational force to left upstream output shaft 73 and right upstream output shaft 75. Left upstream output shaft 73 is connected to cylindrical member 311 of left upstream screw 31 of left screw 3, described above, in order to transmit rotational force to cylindrical member 311 of left upstream screw 31. Right upstream output shaft 75 is connected to cylindrical member 311 of right upstream screw 51 of right screw 5 having substantially the same configuration as left screw 3, described above, in order to transmit rotational force to cylindrical member 311 of right upstream screw 51.

Figure 7:
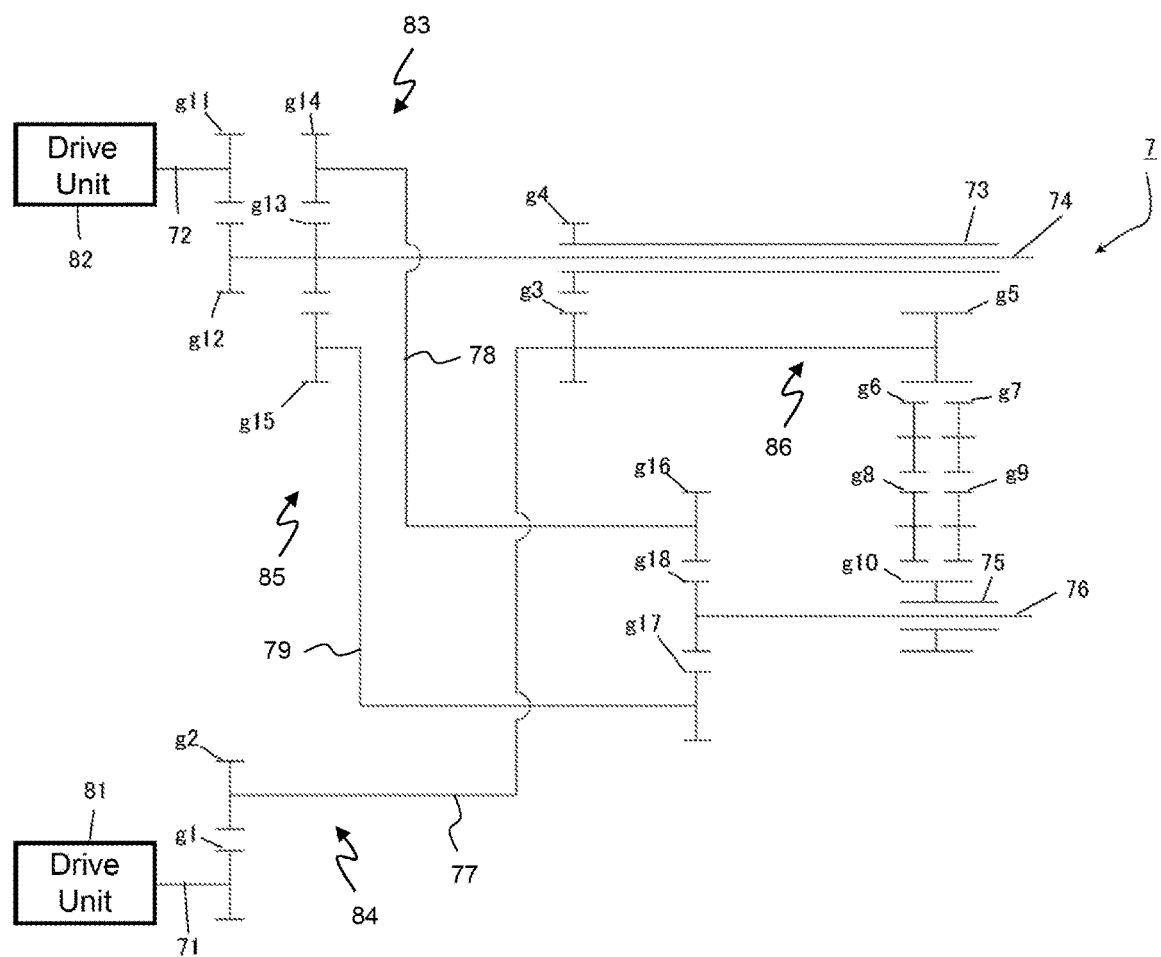
FIG. 7 is a schematic diagram showing the configuration of the gear box shown in FIG. 6A.

Upstream input shaft 71 of gear box 7 is coupled to upstream drive unit 81 (see FIG. 7). On the other hand, downstream input shaft 72 of gear box 7 is coupled to downstream drive unit 82 (see FIG. 7).

FIG. 7 schematically shows an exemplary configuration of gear box 7, described above. Numerals g1 to g18 in the drawing show gears. Gears adjacent to each other in the illustration, such as gear g1 and gear g2, means that they mesh with each other.

First, the transmission mechanism of the rotation from upstream input shaft 71 will be described. Upstream input shaft 71 is provided with gear g1. Gear g1 meshes with gear g2. On the shaft (upstream intermediate shaft 77) that gear g2 is provided, gear g3 and gear g5 are arranged coaxially with gear g2. Gear g3 meshes with gear g4 (a first upstream gear) that is provided on left upstream output shaft 73. That is, the rotation of upstream input shaft 71 driven by upstream drive unit 81 is transmitted to left upstream output shaft 73 via a transfer element including gear g1, gear g2, gear g3 and gear g4.

Further, gear g5 meshes with gear g6 and gear g7. Gear g6 meshes with gear g8. On the other hand, gear g7 meshes with gear g9. Moreover, both gear g8 and gear g9 mesh with gear g10 (a second upstream gear). Gear g10 is provided on right upstream output shaft 75. That is, the rotation of upstream input shaft 71 driven by upstream drive unit 81 is also transmitted to right upstream output shaft 75 via a transfer element including gear g1, gear g2, gear g5, gear g6, gear g7, gear g8, gear g9 and gear g10. Gears g1-g10 and upstream intermediate shaft 77 constitute upstream transmission element 86 that transmits the rotation of upstream input shaft 71 to left upstream output shaft 73 and right upstream output shaft 75. Further, upstream transmission element 86, upstream input shaft 71, left upstream output shaft 73 and right upstream output shaft 75 constitute upstream rotating mechanism 84 that rotates left upstream screw 31 and right upstream screw 51.

Here, the relationship between gear g5, gear g6, gear g7, gear g8, gear g9 and gear g10 will be explained in more detail. The rotation that is transmitted from gear g5 is transmitted to gear g10 through gear g6 and gear g8, and is also transmitted to gear g10 through gear g7 and gear g9. Gear g6 and gear g8 constitute an upstream intermediate transmission element, gear g7 and gear g9 constitute another upstream intermediate transmission element, and these upstream intermediate transmission elements are provided independent of each other. In other words, the rotation that is transmitted from gear g5 is transmitted to gear g10 via two gears, i.e., gear g8 and gear g9. Thus, due to the configuration in which the same rotation (the rotation from gear g5) is transmitted from two gears (gear g8 and gear g9) to gear g10, it is possible to reduce the stress that is applied to each meshing point of gear g10.

Next, the transmission mechanism of the rotation from downstream input shaft 72 will be described. Downstream input shaft 72 is provided with gear g11. Gear g11 meshes with gear g12 (a first downstream gear) that is provided on left downstream output shaft 74. That is, the rotation of downstream input shaft 72 driven by downstream drive unit 82 is transmitted to left downstream output shaft 74 through a transmission element including gear g11 and gear g12.

Further, left downstream output shaft 74 is provided with gear g13. Gear g13 meshes with gear g14 and gear g15. On shaft 78 that is provided with gear g14, gear g16 is arranged coaxially with gear g14. On the other hand, on shaft 79 that is provided with gear g15, gear g17 is arranged coaxially with gear g15. Both gear g16 and gear g17 mesh with gear g18 (a second downstream gear). Gear g18 is provided on right downstream output shaft 76. That is, the rotation of downstream input shaft 72 driven by downstream drive unit 82 is transmitted to right downstream output shaft 76 via a transfer element including gear g11, gear g12, gear g13, gear g14, gear g15, gear g16, gear g17 and gear g18. The rotation is transmitted to gear g18 from two gears, i.e., gear g16 and gear g17. Thus, shafts 78, 79 constitute a plurality of downstream intermediate transmission elements 78, 79 that are independent of each other. Since the same rotation (the rotation from gear g13) is transmitted from two gears (gear g16 and gear g17) to gear g18, it is possible to reduce the stress that is applied to each meshing point of gear g18.

In addition, in gear box 7, the meshing position of gear g11 and gear g12, the meshing position of gear g3 and gear g4, the meshing positions of gear g16, gear g17 and gear g18 and the meshing positions of gear g5, gear g6, gear g7, gear g8, gear g9 and gear g10 are positioned such that the distance between the meshing position and upstream drive unit 81 and downstream drive unit 82 decreases in this order. Further, right upstream output shaft 75 and right downstream output shaft 76 are shorter than left downstream output shaft 74. Therefore, right upstream output shaft 75 and right downstream output shaft 76 are not located adjacent to left downstream output shaft 74 at the position of left downstream output shaft 74 close to downstream drive unit 82 where gear g11 and gear g12 mesh with each other. Further, right upstream output shaft 75 and right downstream output shaft 76 are not located adjacent to left upstream output shaft 73 at the position of left upstream output shaft 73 where gear g3 and gear g4 mesh with each other.

However, left upstream output shaft 73 and left downstream output shaft 74 are located adjacent to right upstream output shaft 76 at the position of right upstream output shaft 76 where gear g16, gear g17 and gear g18 mesh with each other. Further, left upstream output shaft 73 and left downstream output shaft 74 are adjacent to right upstream output shaft 75 at the position of right upstream output shaft 75 where gear g5, gear g6, gear g7, gear g8, gear g9 and gear g10 mesh with each other. Thus, the diameters of gear g18 and gear g10 are small, so that they do not interfere with adjacent left upstream output shaft 73 and left downstream output shaft 74.

With such a configuration, the transmission path of the rotation from upstream drive unit 81 and the transmission path of the rotation from downstream drive unit 82 are independent of each other. Therefore, when upstream drive unit 81 and downstream drive unit 82 drive upstream input shaft 71 and downstream input shaft 72 at different rotational speeds, respectively, it is possible to rotate cylindrical member 311 of left upstream screw 31 that is connected to left upstream output shaft 73, as well as cylindrical member 311 of right upstream screw 51 that is connected to right upstream output shaft 75, at one rotational speed, and to rotate transmission shaft portion 351 of left downstream screw 35 that is connected to left downstream output shaft 74, as well as transmission shaft portion 351 of right downstream screw 55 that is connected to right downstream output shaft 76, at a rotational speed different from the rotational speed above. Therefore, it is possible to rotate the screw flights of left upstream screw 31 of left screw 3 and the screw flights of left downstream screw 35 at different rotational speeds, wherein these screw flights have substantially the same shape and are arranged substantially continuously, as shown in FIG. 3. Similarly, it is possible to rotate the screw flights of right downstream screw 55 of right screw 5 and the screw flights of right downstream screw 55 at different rotational speeds, wherein these screw flights have substantially the same shape and are arranged substantially continuously. At this time, the screw flights of left upstream screw 31 and the screw flights of right upstream screw 51, that are arranged side by side at substantially the same position in the longitudinal direction, are rotated at the same rotational speed. Similarly, the screw flights of left downstream screw 35 and the screw flights of right downstream screw 55, that are arranged side by side at substantially the same position in the longitudinal direction, are rotated at the same rotational speed.

<Method of Extrusion>

Next, the method of extrusion by twin-screw extruder 1 will be described. When the raw material is processed, twin-screw extruder 1 drives upstream drive unit 81 and downstream drive unit 82. Upstream drive unit 81 transmits the rotational power to upstream input shaft 71 of gear box 7. Gear box 7 transmits the inputted rotation to left upstream output shaft 73 and right upstream output shaft 75 (see FIG. 7). On the other hand, downstream drive unit 82 transmits the rotational power to downstream input shaft 72 of gear box 7. Gear box 7 transmits the inputted rotation to left downstream output shaft 74 and right downstream output shaft 76.

Here, left upstream output shaft 73 is connected to left upstream screw 31, and right upstream output shaft 75 is connected to right upstream screw 51. On the other hand, left downstream output shaft 74 is connected to left downstream screw 35, and right downstream output shaft 76 is connected to right downstream screw 55. Thus, left upstream screw 31, right upstream screw 51, left downstream screw 35 and right downstream screw 55 rotate separately (see FIG. 2).

Therefore, twin-screw extruder 1 can extrude the raw material that is supplied from extruder 2 for the feeding portion after twin-screw extruder 1 processes the raw material by left upstream screw 31, right upstream screw 51, left downstream screw 35 and right downstream screw 55. That is, the raw material, that is supplied from extruder 2 for the feeding portion to raw material feeding portion 91, is heated while being agitated in barrel 9 by means of left upstream screw 31 of left screw 3 and right upstream screw 51 of right screw 5, and is conveyed downstream while being gradually melted and kneaded. Thereafter, the raw material, that has been melted and kneaded, is rotated and metered by means of left downstream screw 35 of left screw 3 and right downstream screw 55 of right screw 5 at a rotational speed different from that of left upstream screw 31 and right upstream screw 51, and is discharged from discharge portion 92 at a predetermined discharge rate. In other words, in this configuration, left upstream screw 31 and right upstream screw 51 substantially function as a feeding and kneading portion, and left downstream screw 35 and right downstream screw 55 substantially function as a metering portion (it should be noted that the boundary between the upstream screw and the downstream screw may not coincide with the boundary between the feeding and kneading portion and the metering portion).

In addition, raw material that is supplied to twin-screw extruder 1 from extruder 2 for the feeding portion is at a low temperature. Therefore, the raw material is not scorched and does not adhere to the wall surface of the connecting portion that supplies the material from extruder 2 for the feeding portion to twin-screw extruder 1. In the present embodiment, extruder 2 for the feeding portion and twin-screw extruder 1 are arranged such that their screw axes are perpendicular to each other, but they may be arranged such that the screw axes are in parallel. When the screw axes are arranged in parallel, extruder 2 for the feeding portion and twin-screw extruder 1 are connected by a connecting member.

<Effect>

Hereinafter, the operation and effect of the present embodiment will be described.

In the present embodiment, the driving mechanism for left upstream screw 31 and right upstream screw 51 and the driving mechanism for left downstream screw 35 and right downstream screw 55 are different from each other. Therefore, the upstream screws, i.e., left upstream screw 31 and right upstream screw 51 and the downstream screws, i.e., left downstream screw 35 and right downstream screw 55, can be rotated separately. Accordingly, it is possible to rotate the upstream screws and the downstream screws at different rotational speeds. This enables twin-screw extruder 1 to process raw material in accordance with various specifications.

For example, when raw material is required to be strongly kneaded in a specific application, it is necessary to increase the rotational speed of the kneading portion. If an extruder has a screw that is made of a single rod-shaped member that rotates at a constant rotational speed as a whole, then both the kneading portion that performs strong kneading and the metering portion rotate at the same rotational speed. Thus, there is possibility that desired metering cannot be accurately performed or that the raw material is unstably discharged from the extruder through the metering portion. Therefore, in order to achieve strong kneading, as well as accurate metering and stable discharge of the raw material, a tandem-type extruder must be used in which the kneading portion and the metering portion are constructed as separate apparatuses that are connected to each other. If the raw material is unstably discharged from the extruder, then it may be difficult to produce a molded product having good quality.

On the other hand, in twin-screw extruder 1 according to the present embodiment, left upstream screw 31 and right upstream screw 51 function as a kneading portion, and left downstream screw 35 and right downstream screw 55 function as a metering portion, so that the rotational speed of the screws in the kneading portion and that in the metering portion can be set independent of each other. For example, it is possible to increase the rotational speed of the screws of the kneading portion and not to increase the rotational speed of the screws of the metering portion. In other words, when strong kneading is performed in the kneading portion, the discharge of the raw material from the extruder through the metering portion does not become unstable, and the possibility of manufacturing a product of bad quality is low.

In addition, in the case of a tandem-type extruder in which the kneading portion and the metering portion are configured as different apparatuses, the extruder of the kneading portion and the extruder of the metering portion need to be connected by a connecting member. When both extruders are connected by the connecting member, there is possibility that the high-temperature raw material that is melted by the extruder of the kneading portion adheres to the inner wall surface of the connecting member and stays there when the raw material passes through the connecting member.

On the other hand, twin-screw extruder 1 according to the present embodiment, in which the kneading portion and the metering portion can be configured continuously, has no connecting member between them.

Therefore, there is no possibility in twin-screw extruder 1 that the raw material will be scorched and adhere to the inner wall surface of the connecting member. Further, due to the rotation of left screw 3 and right screw 5, the screw flights are moved such that they polish the inner wall surface of barrel 9. Therefore, in this twin-screw extruder 1, the risk that raw material will be scorched and adhere to the inner wall surface of barrel 9 is small.

Furthermore, left upstream screw 31 and right upstream screw 51 of the present embodiment are configured such that the respective screw flights mesh with each other. Further, left downstream screw 35 and right downstream screw 55 are also configured such that the respective screw flights mesh with each other, and the screws are two-rows screws having self-cleaning property, or screws having so-called ball flights (having a cross-section of a rugby ball shape). Therefore, in this twin-screw extruder 1, the raw material is less likely to be scorched and adhere to the surface of the screws and the inner wall of the cylinder.

As described above, according to twin-screw extruder 1 of the present invention, the possibility that the raw material will be scorched and adhere to each part of the apparatus is low, and degradation of the raw material due to scorching and adhering to wall surfaces can be limited.

As shown in FIG. 3B, fitting portion 313 of left upstream screw 31 is fitted into concave portion 355 of left downstream screw 35. Thus, the raw material is less likely to enter shaft hole 315 of left upstream screw 31. Furthermore, due to labyrinth grooves 354 that are formed in transmission shaft portion 351 that penetrates through shaft hole 315 of left upstream screw 31, the raw material is still less likely to enter shaft hole 315 of left upstream screw 31.

In addition, screw piece 312 of left upstream screw 31 and screw piece 353 of left downstream screw 35 are replaceable. As a result, screw piece 312 and screw piece 353 can be replaced depending on applications, and appropriate screw flights can be easily used.

Further, as described above, left upstream output shaft 73 and left downstream output shaft 74 are arranged adjacent to right downstream output shaft 76 at the position where gear g18 of right downstream output shaft 76 mesh with gear g16 and gear g17, as shown in FIG. 7. Further, left upstream output shaft 73 and left downstream output shaft 74 are arranged adjacent to right upstream output shaft 75 at the position where gear g10 of right upstream output shaft 75 mesh with gear g8 and gear g9. Therefore, gear g18 and gear g10 are formed in gears having small diameters, rather than gears having very large diameters, so as not to interfere with adjacent left upstream output shaft 73 and left downstream output shaft 74. A gear having a small diameter cannot transmit large torque. However, in gear box 7 according to the present embodiment, rotation is transmitted to gear g18 and gear g10 from two gears (see FIG. 7), respectively. That is, the stress that is applied to the teeth of the gear can be reduced as compared to a gear to which the rotation is transmitted from one gear. Therefore, in gear box 7, gear g10 and gear g18 can transmit torque that is required for kneading raw material to right upstream output shaft 75 and right downstream output shaft 76, respectively.

<Modifications>

In twin-screw extruder 1 of the above embodiment, left upstream screw 31 and right upstream screw 51 function as a kneading portion, and left downstream screw 35 and right downstream screw 55 function as a metering portion. However, the present invention is not limited to such a configuration, and the positions of the kneading portion and the metering portion may be determined, as needed.

In the embodiment described above, labyrinth grooves 354 are circular grooves, but labyrinth grooves 354 may be helical grooves or other grooves known as conventional labyrinth grooves. Further, labyrinth grooves 354 may be provided on the outer circumferential surface of the small diameter shaft portion of at least either screw 3 or screw 5.

Screw flights 316, 357 of left screw 3 may not partially or entirely engage screw flight 316, 357 of right screw 5. That is, the present invention may also be applied to a configuration in which left screw 3 and right screw 5 are arranged simply in parallel.

Engaging portion 314 may have any cross section as long as it can engage screw piece 312. Specifically, the cross section of engaging portion 314 may be shaped in involute teeth, but it may also be a polygon. Similarly, engaging portion 356 may have any cross section as long as it can engage screw piece 353. Engaging portions 314 and 356 may have the same cross-section.

Although certain preferred embodiments of the present invention have been shown and described in detail, it should be understood that various changes and modifications may be made without departing from the spirit or scope of the appended claims.

What is claimed is:

1. A twin-screw extruder comprising:
   two screws that extend in parallel to each other, wherein each screw has a cylindrical upstream screw and a downstream screw, wherein the upstream screw has a shaft hole that extends in a longitudinal direction and a screw flight on an outer circumferential surface thereof, and the downstream screw includes a large diameter portion having a screw flight on an outer circumferential surface thereof and a small diameter shaft portion that has a smaller diameter than the large diameter portion, wherein the small diameter shaft portion of the downstream screw is inserted into the shaft hole of the upstream screw, and the upstream screw and the downstream screw can be independently rotated;
   an upstream rotating mechanism that rotates the upstream screws of the two screws;
   a downstream rotating mechanism that is provided independent of the upstream rotating mechanism and that rotates the downstream screws of the two screws;
   an upstream input shaft;
   a downstream input shaft;
   a first upstream output shaft that is connected to the upstream screw of one of the screws and that has the shaft hole;
   a second upstream output shaft that is connected to the upstream screw of the remaining screw and that has the shaft hole;
   a first downstream output shaft that penetrates through the shaft hole of the first upstream output shaft and that is connected to the downstream screw of the one of screws;
   a second downstream output shaft that penetrates through the shaft hole of the second upstream output shaft and that is connected to the downstream screw of the remaining screw;
   an upstream transmission element that transmits rotation of the upstream input shaft to the first upstream output shaft and to the second upstream output shaft; and
   a downstream transmission element that transmits rotation of the downstream input shaft to the first downstream output shaft and to the second downstream output shaft.

2. The twin-screw extruder according to claim 1, wherein the screw flights of the respective upstream screws of the two screws at least partially mesh with each other, and the screw flights of the respective downstream screws of the two screws at least partially mesh with each other.

3. The twin-screw extruder according to claim 1, wherein each upstream screw of the two screw constitutes a kneading portion, and each downstream screw of the two screw constitutes a metering portion.

4. The twin-screw extruder according to claim 1, wherein labyrinth grooves are formed on an outer circumferential surface of the small diameter shaft portion of the downstream screw of at least one of two screws.

5. The twin-screw extruder according to claim 1, wherein the upstream screw includes a cylindrical member having the shaft hole, as well as a screw piece that has the screw flight on an outer circumferential surface thereof and that is fitted onto the cylindrical member, and the screw piece of the upstream screw is removable from the cylindrical member.

6. The twin-screw extruder according to claim 1, wherein the downstream screw has the small diameter shaft portion, as well as a screw piece that is fitted onto the small diameter shaft portion so as to constitute the large diameter portion, and the screw piece of the downstream screw is removable from the small diameter shaft portion.

7. The twin-screw extruder according to claim 1, wherein the second upstream output shaft extends parallel to a portion of the first upstream output shaft,
the upstream transmission element includes:
an upstream intermediate shaft that is connected to the upstream input shaft;
a first upstream gear that connects the upstream intermediate shaft to a portion of the first upstream output shaft where the first upstream output shaft is not adjacent to the second upstream output shaft;
a second upstream gear that connects the upstream intermediate shaft to the second upstream output shaft and that has a smaller diameter than the first upstream gear; and
a plurality of upstream intermediate transmission elements that are independent of each other, wherein each upstream intermediate transmission element connects the upstream intermediate shaft to the second upstream gear.

8. The twin-screw extruder according to claim 1, wherein the second downstream output shaft extends parallel to a portion of the first downstream output shaft,
the downstream transmission element includes:
a plurality of downstream intermediate transmission elements that are independent of each other and that connect a portion of the first downstream output shaft, where the first downstream output shaft is not adjacent to the second downstream output shaft, to the second downstream output shaft;
a first downstream gear that connects the downstream input shaft to the first downstream output shaft, and
a second downstream gear that connects the plurality of downstream intermediate transmission elements to the second downstream output shaft and that has a smaller diameter than the first downstream gear.

9. A method of extrusion using the twin-screw extruder of claim 1,
supplying raw material to the upstream screws of the two screws;
rotating the upstream screws of the two screws by means of the upstream rotating mechanism; and
rotating the downstream screws of the two screws by means of the downstream rotating mechanism, wherein the downstream screws are rotated at a rotational speed different from a rotational speed of the upstream screws.

10. The method of claim 9, wherein:
the first upstream output shaft and the second upstream output shaft of the two screws are rotated by transmitting rotation from the upstream input shaft to the first upstream output shaft and to the second upstream output shaft through the upstream transmission element; and
the first downstream output shaft and the second downstream output shaft of the two screws are rotated by transmitting rotation from the downstream input shaft to the first downstream output shaft and to the second downstream output shaft through the downstream transmission element.

11. A gear box that is incorporated into a twin-screw extruder, wherein the extruder includes two screws that extend in parallel to each other, wherein each screw has an upstream screw having a flight on an outer circumferential surface thereof and a downstream screw having a flight on an outer circumferential surface thereof, and the upstream screw and the downstream screw can be independently rotated, the gear box comprising:
an upstream input shaft;
a downstream input shaft;
a first upstream output shaft that is connected to the upstream screw of one of the screws and that has a shaft hole;
a second upstream output shaft that is connected to the upstream screw of the remaining screw and that has a shaft hole;
a first downstream output shaft that penetrates through the shaft hole of the first upstream output shaft and that is connected to the downstream screw of the one of screws;
a second downstream output shaft that penetrates through the shaft hole of the second upstream output shaft and that is connected to the downstream screw of the remaining screw;
an upstream transmission element that transmits rotation of the upstream input shaft to the first upstream output shaft and to the second upstream output shaft; and
a downstream transmission element that transmits rotation of the downstream input shaft to the first downstream output shaft and to the second downstream output shaft.

\* \* \* \* \*

UNITED STATES PATENT AND TRADEMARK OFFICE
CERTIFICATE OF CORRECTION

| | | |
|---|---|---|
| PATENT NO. | : 11,618,199 B2 | Page 1 of 1 |
| APPLICATION NO. | : 16/969412 | |
| DATED | : April 4, 2023 | |
| INVENTOR(S) | : Kazutoshi Izumiya et al. | |

It is certified that error appears in the above-identified patent and that said Letters Patent is hereby corrected as shown below:

On the Title Page

Item "(73) ASSIGNEE"
Please delete:
"THE JAPAN STEEL WORKS, LTD., Shinagawa-ku (JP)"
Please replace with:
-- THE JAPAN STEEL WORKS, LTD., Shinagawa-ku (JP);
TOKYO PRINTING INK MFG. CO., LTD., Tokyo (JP) --

Signed and Sealed this
Sixteenth Day of May, 2023

Katherine Kelly Vidal
*Director of the United States Patent and Trademark Office*